United States Patent [19]

Hildebrandt

[11] Patent Number: 4,658,196
[45] Date of Patent: Apr. 14, 1987

[54] ELECTRIC MOTOR STARTING SWITCH ASSEMBLY

[75] Inventor: Eugene F. Hildebrandt, St. Louis, Mo.

[73] Assignee: Emerson Electric Co., St. Louis, Mo.

[21] Appl. No.: 788,068

[22] Filed: Oct. 16, 1985

[51] Int. Cl.$^4$ .............................................. H02P 1/42
[52] U.S. Cl. ..................... 318/793; 318/785; 200/80 R; 310/68 E
[58] Field of Search ............... 318/785, 793, 799, 816; 200/80 R; 310/68 E; 361/29

[56] References Cited

U.S. PATENT DOCUMENTS

| | | | |
|---|---|---|---|
| 2,603,732 | 7/1952 | Hinman | 318/793 X |
| 2,811,656 | 10/1957 | Mollenberg | 310/68 E |
| 4,296,366 | 10/1981 | Hildebrandt et al. | 318/793 |
| 4,419,550 | 12/1983 | Monette | 200/80 R |
| 4,473,789 | 9/1984 | Hildebrandt et al. | 318/793 |
| 4,484,116 | 11/1984 | Ellicott et al. | 318/793 X |
| 4,598,185 | 7/1986 | Moore | 318/793 X |

Primary Examiner—Patrick R. Salce
Assistant Examiner—Marc S. Hoff
Attorney, Agent, or Firm—Polster, Polster and Lucchesi

[57] ABSTRACT

A starting switch assembly for an electric motor having a run winding, a starting winding, and a centrifugal actuator. The starting switch assembly includes a first enclosed switch electrically insertable between an electric motor starting winding and a power source to control the application of power to the starting winding. A second enclosed switch is also included, each of the first and second enclosed switches having its own housing for protecting the interior thereof from environmental particles such as lint. The first and second enclosed switches are mounted in a predetermined geometrical relationship and the assembly includes an actuating link responsive to an electric motor centrifugal actuator for simultaneously actuating the first and second switches. The first and second enclosed switches are mounted on a base by a relatively open frame which extends from the base to support the first and second exposed switches in the predetermined geometrical relationship.

16 Claims, 12 Drawing Figures

ELECTRIC MOTOR STARTING SWITCH ASSEMBLY

BACKGROUND OF THE INVENTION

This invention relates to a switch assembly for a dynamoelectric machine, and more particularly to a starting switch assembly for a fractional horsepower induction electric motor.

Typically, capacitor start and split phase induction motors have a run winding and a starting or auxiliary winding placed in winding receiving slots provided in the bore of the stator core of the motor. The starting winding is energized during start-up of the motor (or when the speed of the motor falls below a specified operating speed) so as to create a rotating field in the stator and to apply sufficient torque to the rotor for starting purposes. However, once the motor has accelerated to a desired operating speed (e.g., about 80 pecent or more of the normal operating speed of the motor), the rotor is able to follow the alternations of the magnetic field created by the run windings, and the starting winding is no longer needed. Typically, the starting winding is not intended for continuous use and may fail if not de-energized during normal operation of the motor. As is conventional, a switch, referred to as a motor starting switch, is provided in the motor for energizing the starting winding only during start-up of the motor and for de-energizing the starting winding once the motor has attained its desired operating speed. These motor starting switches are conventionally actuated by a centrifugal actuator mounted on and rotatable with the rotor shaft of the motor, the centrifugal actuator being responsive to the speed of the motor for changing the starting switch from its start to its run state in response to the motor attaining a predetermined operating speed. Centrifugal actuators typically include an actuator member movably movable axially on the rotor shaft from an off or stop position when the motor is stopped (or is operating below a specified operating speed) to a run position upon the motor accelerating to a predetermined operating speed. Typically, an actuator linkage operatively interconnects the motor starting switch and the actuator member of the centrifugal actuator. A centrifugal actuator is shown and described in co-assigned U.S. Pat. No. 4,242,607. Motor starting switches are shown and described in co-assigned U.S. Pat. No. 4,240,001, 4,296,366, and 4,473,789.

During the service life of a motor, end play (i.e., axial movement) of the rotor shaft with respect to the end shields (or the frame) of the motor may develop. This end play may be sufficient so as to appreciably change the relative position of the centrifugal actuator (mounted on the rotor shaft) and the motor starting switch (rigidly mounted on the frame or end shield of the motor), thus affecting operation of the motor starting switch. Under certain end play conditions, the centrifugal actuator could fail to de-energize the starting winding upon the motor attaining its desired operating speed, which could eventually cause the starting winding to fail. Under other end play conditions, the centrifugal actuator may fail to re-set the motor starting switch to energize the starting winding upon subsequent start-up of the motor, and the motor would fail to start.

Also, in certain motor applications (e.g., in a clothes dryer) in which the motor starting switch is exposed to lint-laden air, the deposit of the lint within the switch has heretofore been a problem. More specifically, the motor starting switch is typically installed in the location within the motor proximate the motor bearing lubrication system, and oil vapor is oftentimes deposited on all the exterior surfaces of the switch, including the actuating plunger. Once such lint entered the housing of the starting switch, it would collect on various electrical components within the switch and could, on occasion, prevent good contact between the electrical contacts within the switch. This could cause intermittent or improper operation of the switch and possibly result in failure of the motor to start. The problem of lint and oil vapor requires that the motor starting switch be enclosed in a housing, but such switches are normally installed in a place where space is very limited. Thus, the restrictions on the size of the housing are severe.

In addition to the switch which controls the starting winding, it is also desirable in many applications to have one or more sets of auxiliary contacts to provide control signals or the like for the particular apparatus which incorporates the motor. Preferably, these control signals could occur simultaneously with the switching in or out of the starting winding. Such auxiliary contacts must also be protected from the problems of lint and oil vapor and necessarily increase the size of the starting switch assembly.

Heretofore, actual construction of motor starting switches as described above was relatively complex due to the strict requirements in terms of space, number of contacts, protection of the contacts from foreign matter, and the complexity of the apparatus itself.

One of the objects of this invention is to provide a motor starting switch assembly which is relatively insensitive to end play of the rotor shaft and which need not be accurately positioned with respect to the centrifugal actuator during manufacture of the motor.

Another object of this invention is to provide a motor starting switch assembly which substantially reduces the entrance of lint and other airborne contaminants into the interior of the switch.

Another object of this invention is to provide such a starting switch assembly which is compact in size and rugged in construction, which is reliable in operation, which is easy to install in the motor, and which has a relatively long service life.

Another object of the present invention is to provide such a motor starting switch which is easy to assemble.

Another object is to provide a motor starting switch assembly which requires no adjustment of the switch assembly itself.

Other objects and features of this invention will be apparent to those skilled in the art in light of the following description and accompanying drawings.

SUMMARY OF THE INVENTION

In accordance with this invention, generally stated, a starting switch assembly for an electric motor has first and second enclosed switches. The first enclosed switch is electrically insertable between an electric motor starting winding and a power source to control the application of power to the starting winding. The first and second enclosed switches each have their own housing for protecting the interior thereof from environmental particles, such as lint or the like. Means are provided for mounting the first and second enclosed switches in a predetermined geometrical relationship, and other means responsive to an electric motor centrifugal actuator or the like is provided to simultaneously actuate the first and second switches. The mounting means includes a base and a relatively open frame extending from the base to support the first and second enclosed switches in the predetermined geometrical relationship.

BRIEF DESCRIPTION OF THE DRAWINGS

In the drawings.

Similar reference characters indicate similar parts throughout the several views of the drawings.

DESCRIPTION OF THE PREFERRED EMBODIMENT

Figure 1:
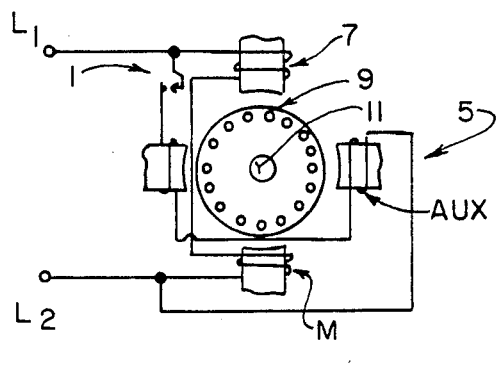
FIG. 1 is an electrical schematic of an electric motor in combination with a starting switch of the present invention.

Referring now to the drawings, a motor starting switch 1, such as that described below in connection with the present invention, is connected in series with the auxiliary or starting winding, labeled AUX, of a conventional dynamoelectric machine 5, such as a split phase fractional horsepower induction motor. The starting switch may be mounted in a conventional manner on the end shield (not shown) of the stator assembly 7 of machine 5. The motor further includes a squirrel cage rotor 9 mounted for rotation within the stator assembly of the motor. The rotor includes a rotor shaft 11 on which the rotor is mounted. The rotor shaft is journaled for rotation in suitable bearings provided in the end shields of the stator assembly. The stator assembly, as is conventional, comprises not only auxiliary starting winding AUX, but also a main winding M. The general arrangement of stator assembly 7 and rotor 9 is, of course, well known to those skilled in the art. The main and auxiliary windings are connected in parallel across a set of power terminals or lines L1 and L2. When starting switch 1 is closed, both windings are energized. However, when the motor comes up to approximately 80 percent of its operating speed, switch 1 opens and only the main winding M is energized.

In the present invention, switch 1 is embodied in a conventional snap action switch such as snap action switch 13, which is a single pole double throw (SPDT) 15 amp, one-half horsepower switch of the microswitch type, such as sold by McGill or Cherry or any of a number of other micro-switch manufacturers. It is advantageous to use such a conventional switch 13, since those switches include a housing H which protects the internal electrical contacts of the switch from contamination by lint or the like. In addition, such switches are small, highly reliable and easy to incorporate into the starting switch assembly, labelled 17, of the present invention. Switch 13 includes a common terminal 19, a normally open terminal 21, and a normally closed terminal 23. Terminal 19 is connected to line L1 (see FIG. 1), while terminal 21 is connected to the auxiliary winding to provide the series connection between line L1 and that winding. Terminal 23 is not needed for switch 1 shown in FIG. 1, but provides a signal to a conventional controller (not shown) for the motor to indicate to the controller the status of the auxiliary winding. Starting switch 13 is mounted in a frame 25 which carries an actuating link 27. Frame 25 is mounted on a flat, relatively rigid base 29 made of a suitable paper-based phenolic or the like. The frame has a channel 31 at one end which mates with one portion of base 29, while the opposite end of the frame is suitably secured to the base such as by a rivet 33.

Actuating link 27 includes a pair of arms 35 which extend out transversely from the actuating link for a purpose which is described below. The actuating link itself is pivotally mounted on frame 25 so that it can move between the positions shown in FIGS. 2 and 3. When the motor is being started, actuating member 27 is held in the position shown in FIG. 2 by a centrifugal actuator 37 (shown schematically in FIG. 2). Centrifugal actuator 37, for example, can be an actuator such as shown in detail in co-assigned U.S. Pat. No. 4,296,366. As the motor comes up to the predetermined fraction of its operating speed, centrifugal actuator 37 moves from the position shown in solid lines in FIG. 2 to that shown in dashed lines. This second position is shown as well in FIG. 3. Such movement of centrifugal actuator 37 releases the actuating link 27 which results in actuating link 27 being forced by the actuator, labelled 39, of switch 13 (which actuator is suitably spring-loaded) to the position shown in FIG. 3. This breaks the circuit between common terminal 19 and normally open terminal 21 and makes the circuit between the common terminal and normally closed terminal 23.

Figure 2:
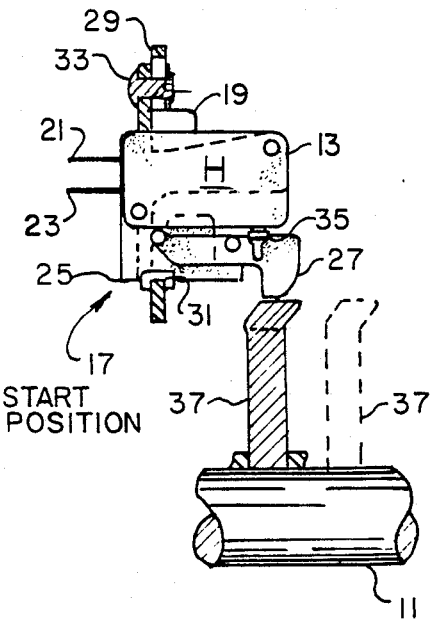
FIG. 2 is a side elevation with parts broken away for clarity of the starting switch assembly of the present invention actuated by a centrifugal actuator.

When the motor is stopped, or if during operation of the motor its speed should fall below the speed at which the centrifugal actuator moves back to the left as shown in FIG. 2, actuating member 27 is forced by actuator 37 back up to the position shown in FIG. 2 thereby putting the auxiliary winding back into the circuit. As a result, when the motor is restarted, starting switch 13 is in the proper state to cause the auxiliary winding to be energized immediately upon application of power to the motor. The inclined surfaces of the actuating link 27 and centrifugal actuator 37, as well as the flat top surface of the centrifugal actuator result in a switch assembly which is extremely tolerant of variations in rotor and centrifugal actuator positions. With this particular configuration, as the centrifugal actuator moves against actuating link 27, the inclined surfaces cause the actuating link to be forced outwardly, thereby actuating switch actuator 39. Once the switch is actuated, the flat surfaces on the bottom of actuating link 27 and the top of centrifugal actuator 37 result in a relatively large length through which the centrifugal actuator can move while still actuating the switch.

Figure 3:
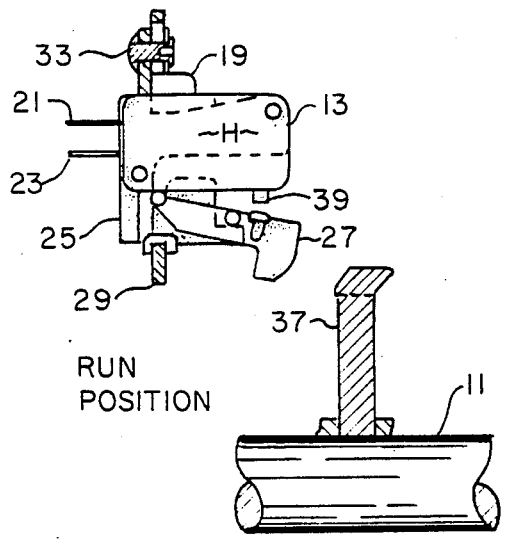
FIG. 3 is a side elevation similar to FIG. 2 showing the starting switch assembly in the run position.
Figure 4:
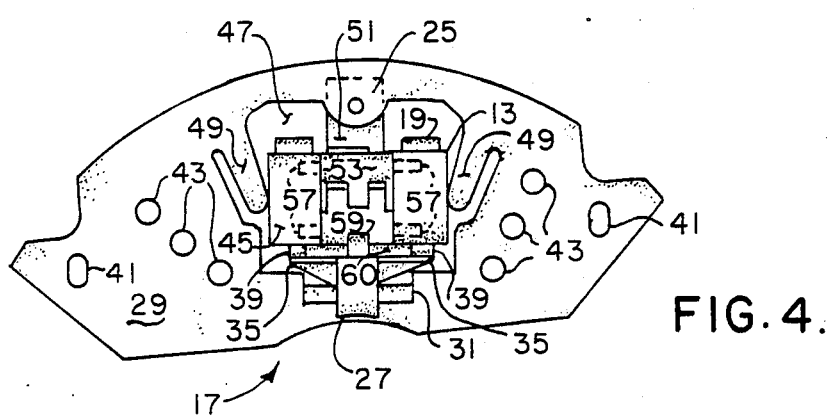
FIG. 4 is a front elevation of the starting switch assembly of the present invention.

Turning now to FIG. 4, base 29 is shown to be suitably shaped to be disposed inside the end shield of a motor and secured thereto by means of suitable fasteners passed through a pair of openings 41. Base 29 also has punched therein a set of holes 43 for passage of the electrical leads from switch 13 and from a single pole throw switch 45. Switch 45 is included so that additional control signals can be obtained from starting switch assembly 17, although for certain applications where such additional control signals are not needed it could be replaced by a dummy block. Switches 13 and 45 are disposed in a large, irregularly-shaped opening 47 in base 29. If switch 45 is replaced by a dummy block, the shape of opening 47 would be suitably changed if necessary. The base includes a pair of compliant fingers 49 which extend from the base into opening 47 to hold switches 13 and 45 against lateral movement. Frame 25 is disposed in opening 47 and is secured as shown in FIG. 3 to base 29 at opposite ends of opening 47. More specifically, frame 25 includes channel member 31 which matingly engages base 29 at the lower part of opening 47. The frame includes a tab 51 (FIG. 4) at its opposite end for riveting the frame to base 29.

Frame 25 also includes means for mounting switches 13 and 45 in a predetermined geometrical relationship. Specifically, frame 25 includes a spacer 53 (FIG. 4) and a spacer 55 (FIG. 5) which are disposed between the switches and determine the spacing therebetween. In addition, spacers 53 and 55 have posts 57 at each end which extend into corresponding openings through the housings H of each switch. These openings are conventional for mounting micro switches and do not expose the interior of the switch to the environment. Spacers 53 and 57 thus not only determine the spacing between the switches, but also perform a mounting function. Frame 25 also includes a guide 59 which ensures that actuating link 27 travels in a generally straight line to simultaneously actuate the individual actuators 39 of the two switches when the link is struck by the centrifugal actuator. Arms 35 of actuating link 27 extend out transversely from the body of the actuating link a distance corresponding to the spacing between actuators 39 of switches 13 and 45 so that when the actuating link is forced outwardly by the centrifugal actuator of the motor, both switch actuators 39 are actuated simultaneously. Link 27 also includes a rod 60 which defines a pivot axis of the actuating link, which rod is disposed generally adjacent the switch housings H of the two snap-action switches.

Figure 5:
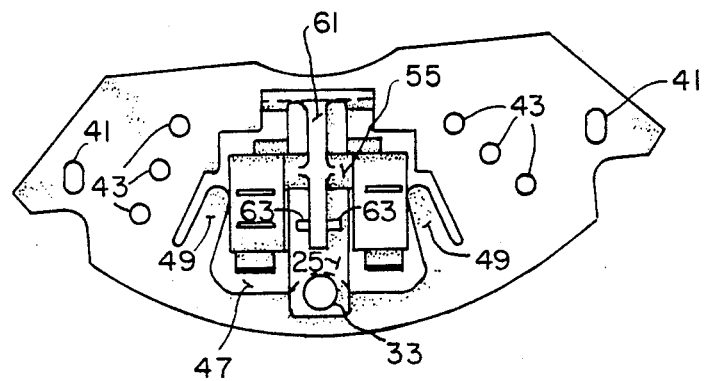
FIG. 5 is a rear elevation of the starting switch assembly of the present invention.

Turning briefly to FIG. 5, the rear of frame 25 is seen to include a reinforcing rib 61 which in turn has transverse reinforcing members 63.

Frame 25 is designed to be relatively open and lightweight, as is actuating link 27. These two parts are easily snapped together, as is described in detail below, and are preferably molded parts of a suitable plastic, such as glass reinforced polyester.

Figure 6:
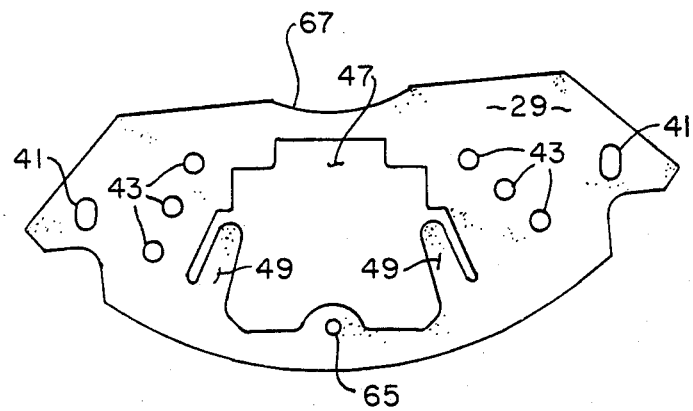
FIG. 6 is a front elevation of a base for the switch assembly of FIG. 4.

Base 29 (FIG. 6) is dimensioned and shaped to fit in the relatively confined space between the electric motor and one of its end shields. The opening 47 in base 29 is suitably shaped to hold switches 13 and 45 therein as positioned by frame 25. Compliant fingers 49 are an integral part of base 29 which extend into opening 47 to provide additional support for the switches. Base 29 also includes a suitable opening 65 for rivet 33. Note as well that the perimeter of base 29 is suitably shaped at the portion labeled 67 to allow for clearance of the centrifugal actuator of the electric motor.

Figure 7:
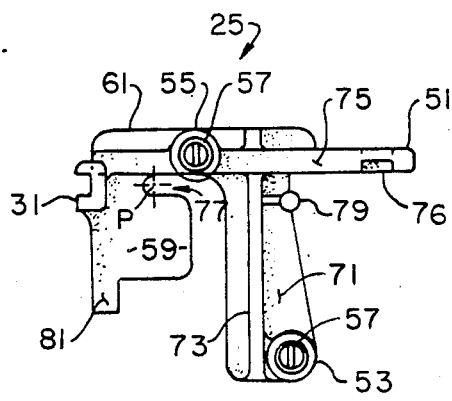
FIG. 7 is a side elevation of an enlarged scale of a frame for the switch assembly of FIG. 4.
Figure 8:
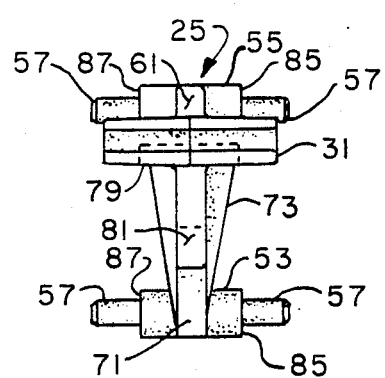
FIG. 8 is a front elevation of the frame of FIG. 7.
Figure 9:
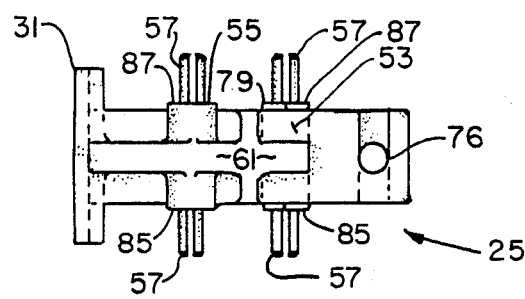
FIG. 9 is a top plan of the frame of FIG. 7.

Frame 25 is shown in more detail in FIGS. 7 through 9. Frame 25 is an integrally molded part having a central stem 71 which is reinforced by a rib 73. Spacer 53 is disposed at one end of stem 71, while spacer 55 is disposed at the other end. Running transversely to stem 71 is the back, labelled 75, of frame 25, which includes tab 51 at one end and channel 31 at the other. Tab 51 includes an opening 76 for rivet 33 to pass through. Depending from back 75 at the same end thereof as channel 31 is guide member 59 which limits the movement of actuating link 27 as it is moved by the centrifugal actuator of the motor. Guide 59 and back 75 of frame 25 define a pivot axis P about which actuating member 27 pivots as it is forced outwardly by centrifugal actuator 37. Rod 60 of actuating link 27 extends along pivot axis P. This rod snaps into the generally semi-circular opening between guide 59 and back 75, which opening is labeled 77. Spacer 55 extends downwardly into the passage between back 75 and guide 59. It is preferred that spacer 55 extend down into this passage at least on one side of back 75, and be dimensioned such that there is a tight fit for actuating link 27 as it is snaped into opening 77. When assembly 17 is completely assembled, rod 60 is held in place in opening 77 by the housings H of the snap-action switches.

Stem 71 also includes a spacer 79 which, in conjunction with spacers 53 and 55, defines the spacing between switches 13 and 45. Spacer 79, however, does not extend into the switches as do the posts 57 on spacers 53 and 55. Rather, it provides a third contact point between the frame and each of the two switches to provide additional stability.

A tab 81 extends downwardly from guide 59 to provide a stop for actuating link 27 as it moves inwardly to the position shown in FIG. 3. Actuating link 27 includes a cross bar 83 (FIG. 11) which engages tab 81 as the actuating link is allowed to move inwardly to the position shown in FIG. 3. Once it reaches that position, bar 83 strikes tab 81, thereby preventing further inward movement of the actuating link.

Spacers 53 and 55 include a pair of shoulders 85 and 87 which abut the housings H of switches 13 and 45. Posts 57 extend outwardly from shoulders 85 and 87 and into the openings through housings H when the starting switch assembly of the present invention is assembled. Posts 57 are split so that they may be readily inserted in the openings in housings H but once inserted are held therein by a press or interference fit. Of course, it is not essential that the posts be split; numerous other post designs could be used to accomplish the desired press fit.

Figure 10:
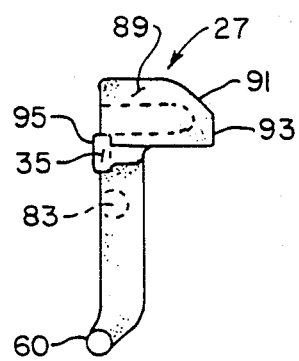
FIG. 10 is a side elevation on an enlarged scale of a switch actuating link of the assembly of FIG. 4.
Figure 11:
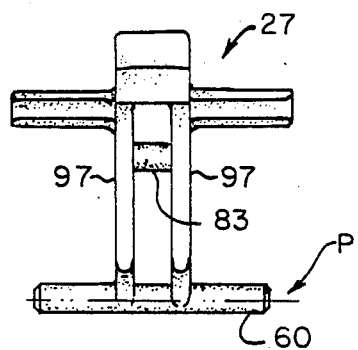
FIG. 11 is a front elevation of the switch actuating link of FIG. 10.
Figure 12:
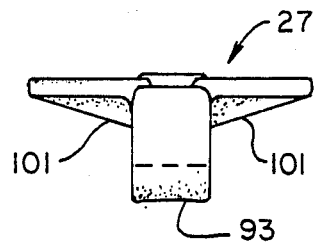
FIG. 12 is a top plan of the switch actuating link of FIG. 10.

Turning now to FIGS. 10 through 12, actuating link 27 is a single integrally formed piece having a generally hollow head 89 with an inclined front surface 91 for suitable engagement with the centrifugal actuator. The head terminates in a flat portion 93 (as seen from the side) upon which the centrifugal actuator can ride during actuation of the switches. Arms 35 extend out from the body of actuating link 27 immediately below head 89 and include a flat surface 95 for actuating the actuators of the switches. The body of actuating link 27 includes two spaced apart ribs 97 connected by stop or bar 83 at the middle, and by head 89 at one end. Ribs 97 are also connected at the opposite end by pivot rod 60 which defines the axis of rotation P for the switch assembly. The arms 35 of actuating link 27 include a pair of webs 101 which reinforce the arms and connect them to the body of the actuating link. Note that although the surface 93 of head 89 is relatively flat as shown in FIG. 10, FIG. 12 reveals that from the direction of the motor, it is slightly curved so as to correspond more closely to the curvature of the centrifugal actuator when the actuator is in contact with the actuating link.

Assembly of starting switch assembly 17 is relatively easy. Actuating link 27 and frame 25, which are small molded parts, are snapped together and then the switches 13 and 45 are secured in position on the frame by pushing them onto the integrally molded pins 57 in the frame. In this position, housings H of the snap-action switches confine rod 60 of the actuating link in opening 77 of the frame. This assembly is then placed in opening 47 of base 29 with channel 31 engaging the corresponding portion of the base and compliant fingers 49 engaging the housings H of the snap-action switches. Assembly is completed by riveting the frame to the base by rivet 33. This provides a starting switch assembly which gives total enclosure of the switch elements for protection from lint and dust while taking up a minimum of space. The switches themselves, being conventional items, are relatively inexpensive and readily available.

Although the invention has been described with the switches mounted generally along the motor shaft axis, it should be realized that with minor modifications such as a switch assembly can be used which has the switches disposed at right angles to the motor shaft axis.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A starting switch assembly for an electric motor, said motor having a run winding, a starting winding, and a centrifugal actuator or the like, said starting switch assembly comprising:
    a first enclosed switch electrically insertable between an electric motor starting winding and a power source to control the application of power to the starting winding, closure of said switch completing a circuit between the starting winding and the power source, said first switch having its own housing for protecting the interior thereof from environmental particles such as lint or the like;
    a base securable to an end shield or the like of an electric motor;
    a relatively rigid, open frame extending from the base to support the first enclosed switch in a predetermined position, said frame being electrically isolated from the circuit between the starting winding and the power source; and
    means responsive to an electric motor centrifugal actuator or the like for actuating the first enclosed switch.

2. A starting switch assembly for an electric motor, said motor having a run winding, a starting winding, and a centrifugal actuator or the like, said starting switch assembly comprising;
    a first enclosed switch electrically insertable between an electric motor starting winding and a power source to control the application of power to the starting winding, said first switch having its own housing for protecting the interior thereof from environmental particles such as lint or the like;
    a base securable to an end shield or the like of an electric motor, said first enclosed switch extending through an opening in the base;
    a relatively open frame extending from the base to support the first enclosed switch in a predetermined position; and
    means responsive to an electric motor centrifugal actuator or the like for actuating the first enclosed switch.

3. The starting switch assembly as set forth in claim 2 wherein the first switch is secured to the frame on both sides of the opening in the base.

4. The starting switch assembly as set forth in claim 2 further including a second enclosed switch having its own housing and extending through the opening in the base, wherein the base includes a pair of compliant fingers disposed adjacent the opening in the base which fingers abut the sides of the first and second enclosed switches extending through said opening to restrict sideways movement of said switches.

5. A starting switch assembly for an electric motor, said motor having a run winding, a starting winding, and a centrifugal actuator or the like, said starting switch assembly comprising:
    a first enclosed switch electrically insertable between an electric motor starting winding and a power source to control the application of power to the starting winding, said first switch having its own housing for protecting the interior thereof from environmental particles such as lint or the like;
    a base securable to an end shield or the like of an electric motor;
    a relatively open frame extending from the base to support the first enclosed switch in a predetermined position;
    means responsive to an electric motor centrifugal actuator or the like for actuating the first enclosed switch; and
    a second enclosed switch having its own housing, said first and second enclosed switches being disposed mechanically parallel to and spaced from each other, said frame being disposed generally between the switches.

6. A starting switch assembly for an electric motor, said motor having a run winding, a starting winding, and a centrifugal actuator or the like, said starting switch assembly comrising:
    a first enclosed switch electrically insertable between an electric motor starting winding and a power source to control the application of power to the starting winding, said first switch having its own housing for protecting the interior thereof from environmental particles such as lint or the like;
    a base securable to an end shield or the like of an electric motor;
    a relatively open frame extending from the base to support the first enclosed switch in a predetermined position; and
    means responsive to an electric motor centrifugal actuator or the like for actuating the first enclosed switch;
    said frame including a channel for mating engagement with the base along a predetermined portion of the perimeter of an opening in the base.

7. The starting switch assembly as set forth in claim 6 further including means for securing the frame to the base.

8. The starting switch assembly as set forth in claim 7 wherein the frame is permanently secured by the securing means to the base.

9. A starting switch assembly for an electric motor, said motor having a run winding, a starting windig, and a centrifugal actuator or the like, said starting switch assembly comprising:
 a first enclosed switch electrically insertable between an electric motor starting winding and a power source to control the application of power to the starting winding, said first switch having its own housing for protecting the interior thereof from environmental particles such as lint or the like;
 a base securable to an end shield or the like of an electric motor;
 a relatively open frame extending from the base to support the first enclosed switch in a predeterined position;
 means responsive to an electric motor centrifugal actuator or the like for actuating the first enclosed switch; and
 a second enclosed switch having its own housing, said frame supporting each enclosed switch at at least three points.

10. A starting switch assebly for an electric motor, said motor having a run winding, a starting winding, and a centrifugal actuator or the like, said starting switch assembly comprising:
 a first enclosed switch electrically insertable between an electric motor starting winding and a power source to control the application of power to the starting winding, said first switch having its own housing for protecting the interior thereof from environmental particles such as lint or the like;
 a second enclosed switch;
 a base securable to an end shield or the like of an electric motor;
 a relatively open frame extending from the base to support the first and second enclosed switches in a predetermined position; and
 means responsive to an electric motor centrifugal actuator or the like for actuating the first and second enclosed switches;
 said frame being disposed intermediate the two enclosed switches, each switch having its own housing, and including means for defining the spacing between the two switches.

11. The starting switch assembly as set forth in claim 10 wherein the two enclosed switches are secured to the frame at at least two points and wherein the spacing means includes shoulders for abutting the housing of each switch at the points of securement.

12. A starting switch assembly for an electric motor, said motor having a run winding, a starting winding, and a centrifugal actuator or the like, said starting switch assembly comprising:
 a first enclosed switch electrically insertable between an electric motor starting winding and a power source to control the application of power to the starting winding, said first switch having its own housing for protecting the interior thereof from environmental particles such as lint or the like;
 a base securable to an end shield or the like of an electric motor;
 relatively open frame extending from the base to support the first enclosed switch in a predetermined position; and
 means responsive to an electric motor centrifugal actuator or the like for actuating the first enclosed switch, said actuating means being mounted on the frame for pivoting movement about a pivot axis.

13. The starting switch assembly as set forth in claim 12 further including a second enclosed switch having its own housing, wherein the actuating means includes a rod which defines the pivot axis, the ends of the rod being disposed generally adjacent the housings of the first and second enclosed switches, said actuating means simultaneously actuating the first and second switches.

14. The starting switch assembly as set forth in claim 13 wherein the frame and switch housings confine the actuating means to pivotal movement about the pivot axis.

15. A starting switch assembly for an electric motor, said motor having a run winding, a starting winding, and a centrifugal actuator or the like, said starting switch assembly comprising:
 a first enclosed switch electrically insertable between an electric motor starting winding and a power source to control the application of power to the starting winding, said first switch having its own housing for protecting the interior thereof from environmental particles such as lint or the like;
 a base securable to an end shield or the like of an electric motor;
 a relatively open frame extending from the base to support the first enclosed switch in a predetermined position; and
 means responsive to an electric motor centrifugal actuator or the like for actuating the first enclosed switch;
 said actuating means being pivotally mounted on the frame and the frame including guide means for controlling the direction of motion of the actuating means.

16. A starting switch assembly for an electric motor, said motor having a run winding, a starting winding, and a centrifugal actuator or the like, said starting switch assembly comprising:
 a first enclosed switch electrically insertable between an electric motor starting winding and a power source to control the application of power to the starting winding, said first switch having its own housing for protecting the interior thereof from environmental particles such as lint or the like;
 a base securable to an end shield or the like of an electric motor;
 a relatively open frame extending from the base to support the first enclosed switch in a predetermined position;
 means responsive to an electric motor centrifugal actuator or the like for actuating the first enclosed switch; and
 a second enclosed switch having its own housing, said actuating means including a receiving surface for engagement by the centrifugal actuator upon longitudinal movement thereof, said actuating means further including a pair of arms extending generally perpendicularly to the longitudinal axis of the centrifugal actuator and disposed adjacent the first and second enclosed switches, which arms are forced toward said switches upon said longitudinal movement of the centrifugal actuator to substantially simultaneously actuate both switches.

* * * * *